United States Patent
Motwani (10) Patent No.: US 10,133,634 B2
(45) Date of Patent: Nov. 20, 2018

(54) METHOD FOR PERFORMING IN-PLACE DISK FORMAT CHANGES IN A DISTRIBUTED STORAGE NETWORK

(71) Applicant: International Business Machines Corporation, Armonk, NY (US)

(72) Inventor: Manish Motwani, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 42 days.

(21) Appl. No.: 15/473,942

(22) Filed: Mar. 30, 2017

(65) Prior Publication Data
US 2018/0285196 A1    Oct. 4, 2018

(51) Int. Cl.
G06F 11/10     (2006.01)
G06F 3/06      (2006.01)

(52) U.S. Cl.
CPC ........ *G06F 11/1092* (2013.01); *G06F 3/064* (2013.01); *G06F 3/067* (2013.01); *G06F 3/0619* (2013.01); *G06F 3/0644* (2013.01)

(58) Field of Classification Search
CPC .... G06F 11/1092; G06F 3/0619; G06F 3/064; G06F 3/0644; G06F 3/067
USPC ....... 714/764, 702, 718, 751, 752, 763, 769, 714/770, 773, 799, 6.1, 6.2, 6.22, 6.24, 4; 711/111, 114, 170; 709/231; 707/822
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — John J Tabone, Jr.
(74) *Attorney, Agent, or Firm* — Garlick & Markison; Timothy W. Markison; Kelly H. Hale (57) ABSTRACT

A method begins by processing modules in a dispersed storage network (DSN) identifying a memory device having a legacy slice storage format (SSF) to a second SSF and that includes a first encoded data slice (EDS) of a set of EDSs. When at least a predetermined threshold number of EDSs of the set of EDSs are included within one or storage units (SUs) excluding the first EDS the method continues by transitioning the first SSF of the memory device to the second SSF, and performing a rebuilding process using the at least the decode threshold number of EDSs of the set of EDSs to generate a rebuilt first EDS. The method continues by storing the rebuilt first EDS within the memory device to replace the first EDS that was deleted during the transitioning.

20 Claims, 8 Drawing Sheets

(56) References Cited

U.S. PATENT DOCUMENTS

| | | |
|---|---|---|
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,521,697 B2* | 8/2013 | Grube .................. G06F 11/2094 707/679 |
| 8,649,521 B2* | 2/2014 | Grube .................. G06F 11/1076 380/256 |
| 8,885,821 B2* | 11/2014 | Grube .................. G06F 11/1076 380/260 |
| 8,959,366 B2* | 2/2015 | Grube .................. G06F 11/1076 713/194 |
| 8,972,684 B2* | 3/2015 | Resch .................. G06F 12/0646 711/114 |
| 9,927,977 B2* | 3/2018 | Volvovski ............... G06F 17/30 |
| 10,001,950 B2* | 6/2018 | Dhuse .................. G06F 3/0659 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0182424 A1* | 7/2011 | Grube .................. G06F 21/72 380/43 |
| 2011/0182429 A1* | 7/2011 | Grube .................. G06F 21/72 380/268 |
| 2011/0185193 A1* | 7/2011 | Grube .................. G06F 21/72 713/194 |
| 2014/0344645 A1* | 11/2014 | Gladwin ................ G06F 21/72 714/763 |
| 2018/0107424 A1* | 4/2018 | Baptist ................. G06F 3/0644 |
| 2018/0107550 A1* | 4/2018 | Dhuse ................. G06F 11/1092 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 1511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

METHOD FOR PERFORMING IN-PLACE DISK FORMAT CHANGES IN A DISTRIBUTED STORAGE NETWORK

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
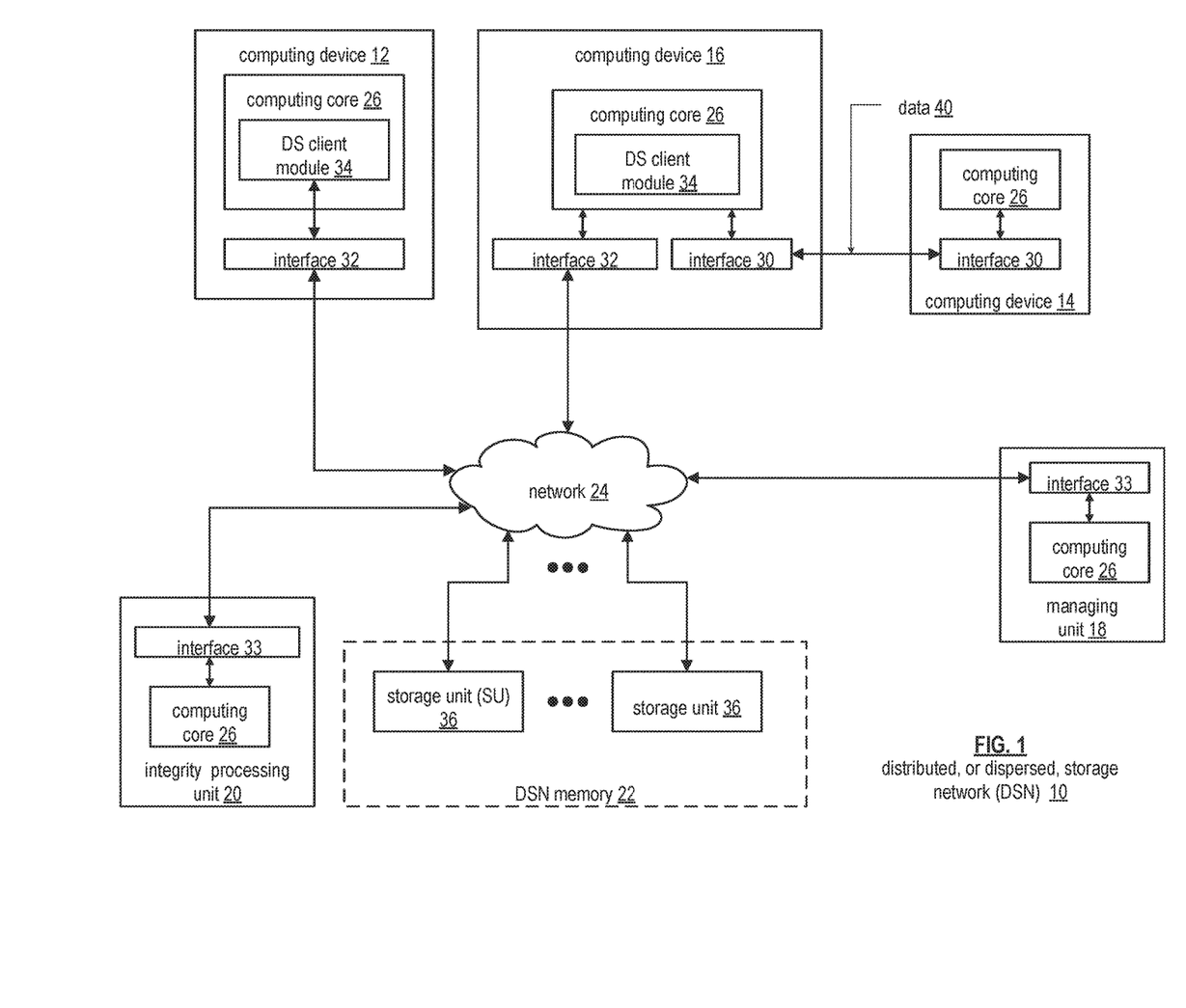
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
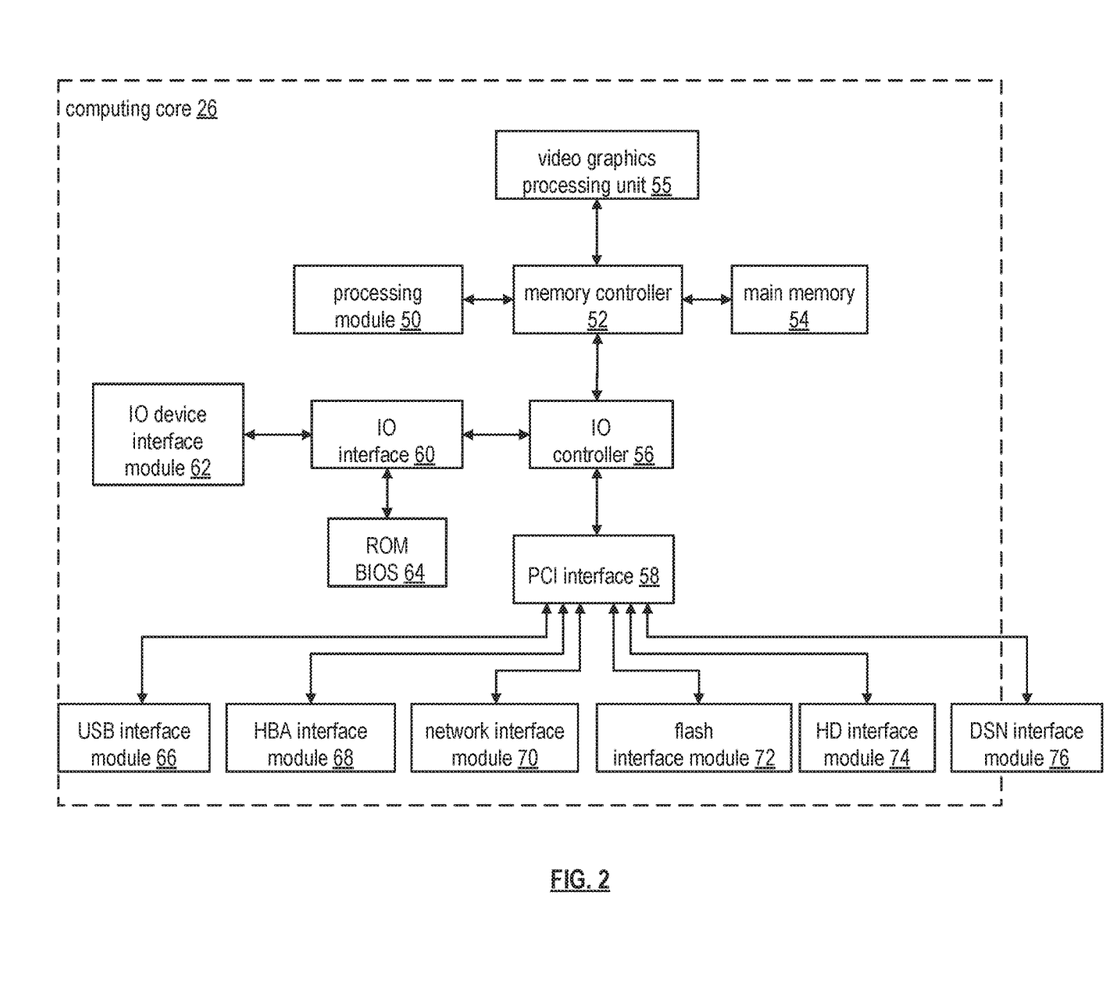
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), interne small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
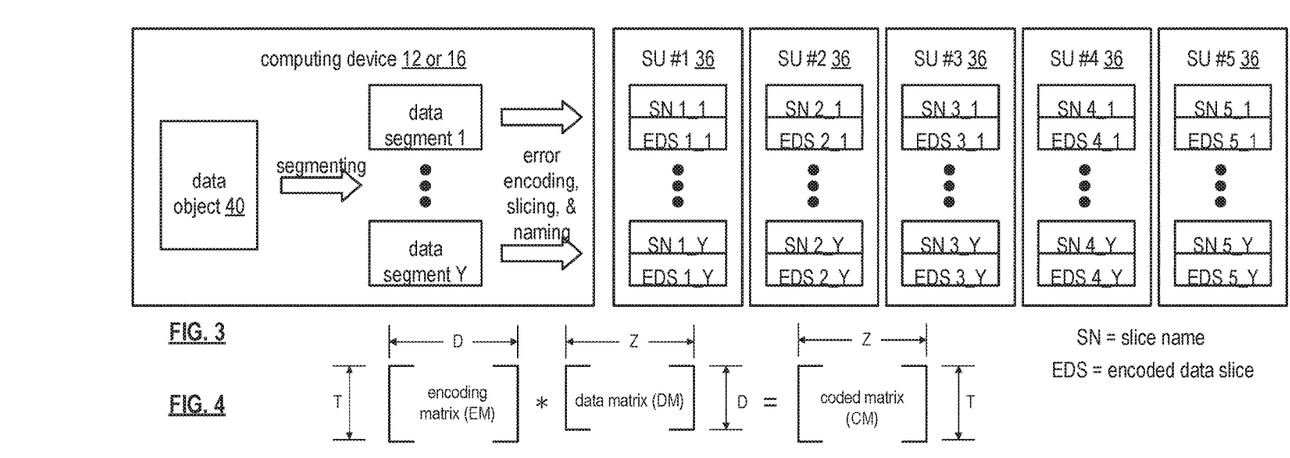
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
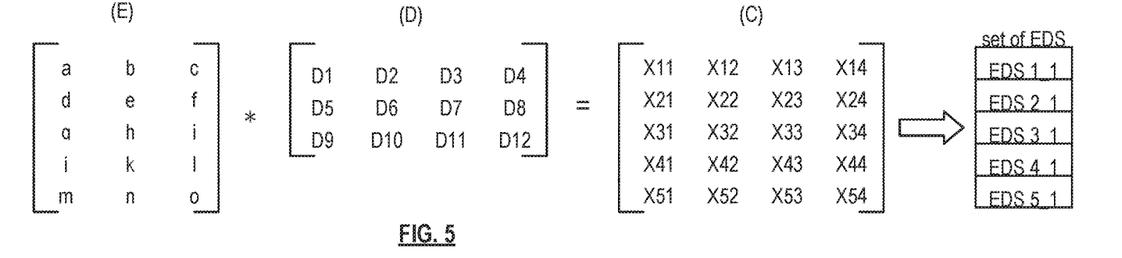
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
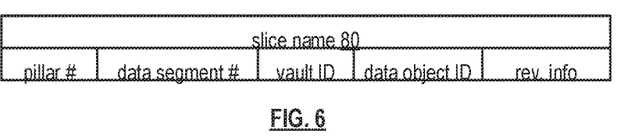
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
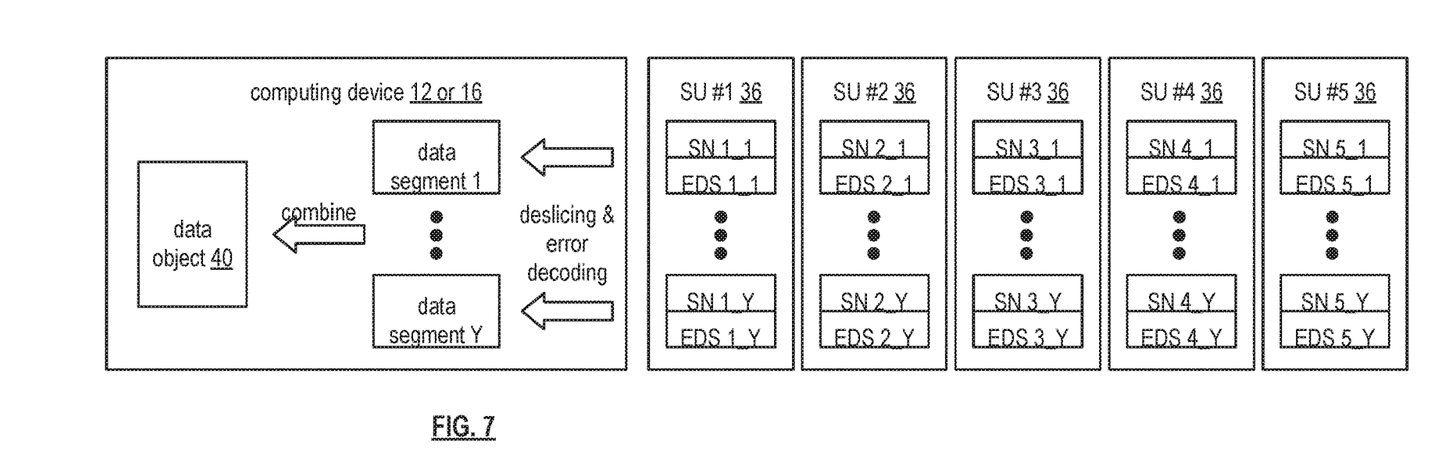
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
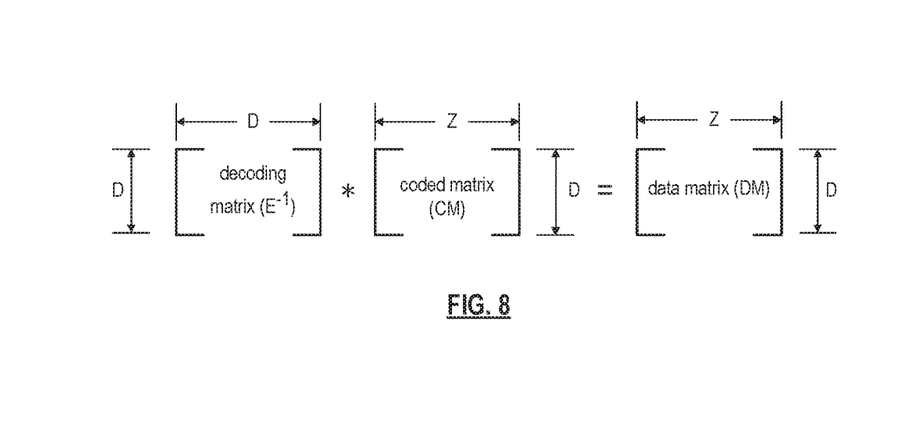
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
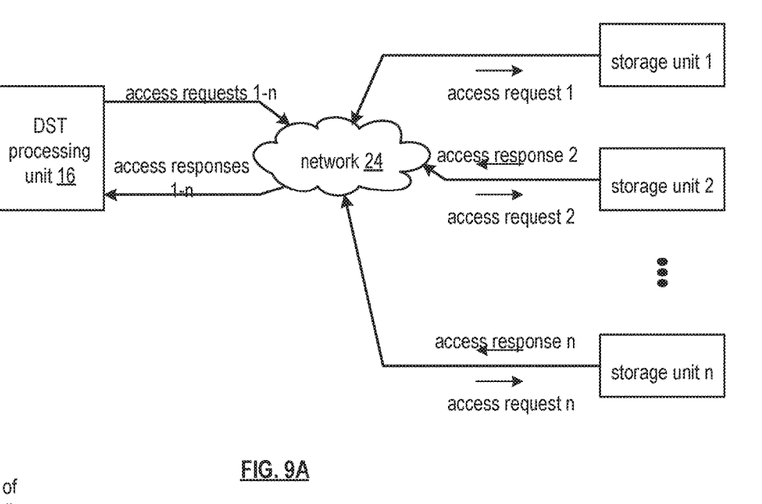
FIG. 9A is a schematic block diagram of another embodiment of a dispersed storage network in accordance with the present invention.

FIG. 9A is a schematic block diagram of another embodiment of a dispersed storage network (DSN) that includes the computing unit 16 of FIG. 1, the network 24 of FIG. 1, and a set of storage units 1-n. Each storage unit may be implemented utilizing the storage unit 36 of FIG. 1. The DSN functions to access encoded data slices, where the computing unit 16 issues, via the network 24, access requests (e.g., as many as 1-n) to the set of storage units and receives, via the network 24, access responses (e.g., as many as 1-n) from the set of storage units, where the access requests includes one or more of a list slice request, a read slice request, a write slice request, and a delete slice request, and where the access responses includes a list slice response, a read slice response, a write slice response, and a delete slice response.

The accessing of the encoded data slices further includes storing of initially generated encoded data slices when storing data, replacing encoded data slices associated with storage errors (e.g., rebuilding), and recovery of encoded data slices to reproduce the data, where the computing unit 16 dispersed storage error encodes a data segment of the data to produce a set of encoded data slices 1-n (e.g., an Information Dispersal Algorithm (IDA) width number), and where a decode threshold number of encoded data slices of the set of encoded data slices are required for recovery of the data.

A variety of thresholds may be utilized in conjunction with the accessing of the encoded data slices. For example, a send threshold number of encoded data slices of the set of encoded data slices may be sent to the storage units for storage. As another example, the replacing of the encoded data slices associated with the storage errors may include maintaining a preservation threshold number of encoded data slices of the set of encoded data slices. As yet another example, detection of the storage error may be identified when a delayed rebuilt threshold number of encoded data slices are remaining of the set of encoded data slices.

A threshold hierarchy may be utilized to provide the DSN with desired levels of reliability, availability, failure tolerance, and rebuilding traffic. For example, the send threshold is established as less than the IDA width, the preservation threshold is established as less than the send threshold, and the delayed rebuilt threshold is set to less than the preservation threshold. The example threshold hierarchy affects reliability as a function of a difference between the delayed rebuilt threshold and the IDA threshold, affects reduction of rebuilding traffic based on a difference between the preservation threshold and the delayed rebuild threshold, affects availability and/or performance based on a difference between the send threshold and the preservation threshold, and affects failure toleration based on a difference between the IDA width and the send threshold. An example of operation of the accessing of the encoded data slices within the DSN is discussed in greater detail with reference to the timing diagram of FIG. 9B.

Figure 9B:
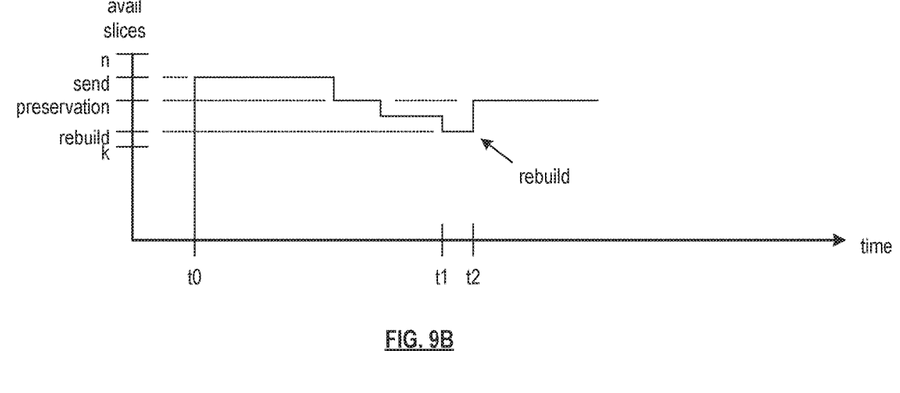
FIG. 9B is a timing diagram illustrating accessing of encoded data slices in accordance with the present invention.

FIG. 9B is a timing diagram illustrating accessing of encoded data slices within the DSN a FIG. 9A. At t0 (e.g., time zero), when storing a data segment, the computing unit 16 facilitates storage of a send threshold number of encoded data slices of the set of encoded data slices, where the data segment is dispersed storage error encoded to produce the set of encoded data slices. The facilitating includes issuing the send threshold number of access requests (e.g., write slice requests), to storage units of the set of storage units, receiving access responses, issuing one or more additional write request when receiving less than a send threshold number of favorable access responses within an access time frame such that the send threshold number of encoded data slices are successfully stored in the set of storage units.

Having initially stored the send threshold number of encoded data slices, at t1, when detecting that the number of favorably stored encoded data slices is less than or equal to the rebuild threshold number, the computing unit 16 facilitates storage of one or more rebuilt encoded data slices such that at least a preservation threshold number of encoded data slices are favorably stored at t2. The facilitating includes one or more of rebuilding a missing encoded data slice to produce a rebuilt encoded data slice, sending, via the network 24, another write slice request to a storage unit associated with the rebuilt encoded data slice, where the other write slice request includes the rebuilt encoded data slice, and receiving one or more access responses, interpreting the received access responses to determine a number of favorably stored encoded data slices, and continuing to store for the rebuilt encoded data slices until the number of favorably stored encoded data slices is substantially the same as the preservation threshold number.

Figure 9C:
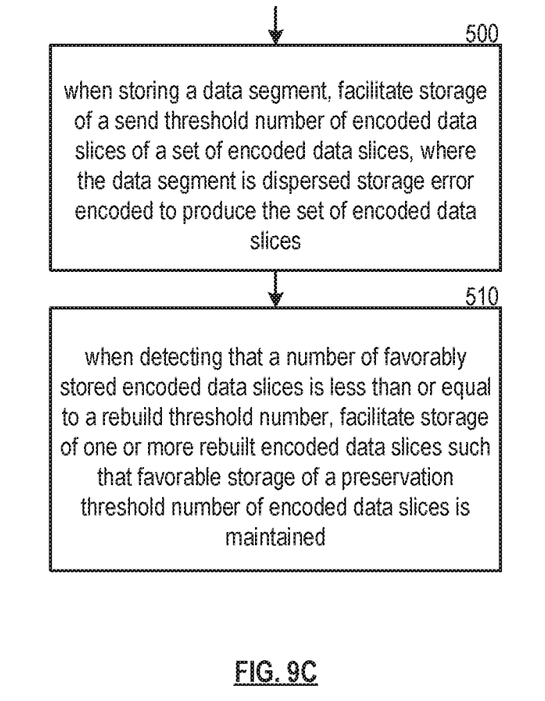
FIG. 9C is a flowchart illustrating an example of maintaining storage of a favorable number of encoded data slices of a set of encoded data slices in accordance with the present invention.

FIG. 9C is a flowchart illustrating an example of maintaining storage of a favorable number of encoded data slices of a set of encoded data slices. The method includes a step 500 where a processing module (e.g., of a distributed storage and task (DST) processing unit), when storing a data segment, facilitate storage of a send threshold number of encoded data slices of a set of encoded data slices, where the data segment is dispersed storage error encoded to produce the set of encoded data slices. For example, the processing module issues at least a send threshold number of access requests (e.g., write slice requests, the storage units of the set of storage units, receives access responses, issues one or more additional write requests when receiving less than a send threshold number of favorable access responses within an access time frame such that the send threshold number of encoded data slices are successfully stored in the set of storage units.

When detecting that a number of favorably stored encoded data slices is less than or equal to a rebuild threshold number, the method continues at the step 510 where the processing module facilitate storage of one or more rebuilt encoded data slices such that favorable storage of a preservation threshold number of encoded data slices is maintained. For example, the processing module rebuilds a missing encoded data slice to produce a rebuilt encoded data slice and sends another write slice request to a storage unit of the set of storage units, where the other write slice request includes the rebuilt encoded data slices, receives one or more access responses, interprets the received access responses to determine a number of favorably stored encoded data slices, and continue storing rebuilt encoded data slices until the number of favorably stored encoded data slices is substantially the same as the preservation threshold number.

When new slice storage formats (SSFs) become available, previously written encoded data slices on a memory device using a legacy SSF must be migrated from the legacy SSF to a memory device incorporating the new SSF. New SSFs, sometimes called "disk formats" or "on-disk formats", are desirable for a number of reasons, including, but not limited to enhanced performance and/or efficiency. Disk formatting is often described as the process of preparing a data storage device such as a hard disk drive, solid state drive, floppy disk or USB flash drive for initial use. Examples of on-disk formats include The ext4 or fourth extended filesystem, which is a journaling file system for Linux developed as the successor to ext3. Using ext4, for example, a fixed number of files can be pre-allocated on a memory device and new encoded data slices can then be appended to these existing files. An SSF could even incorporate custom data structures directly on the memory device, without using existing file systems such as Linux ext3, or ext4.

Figure 10:
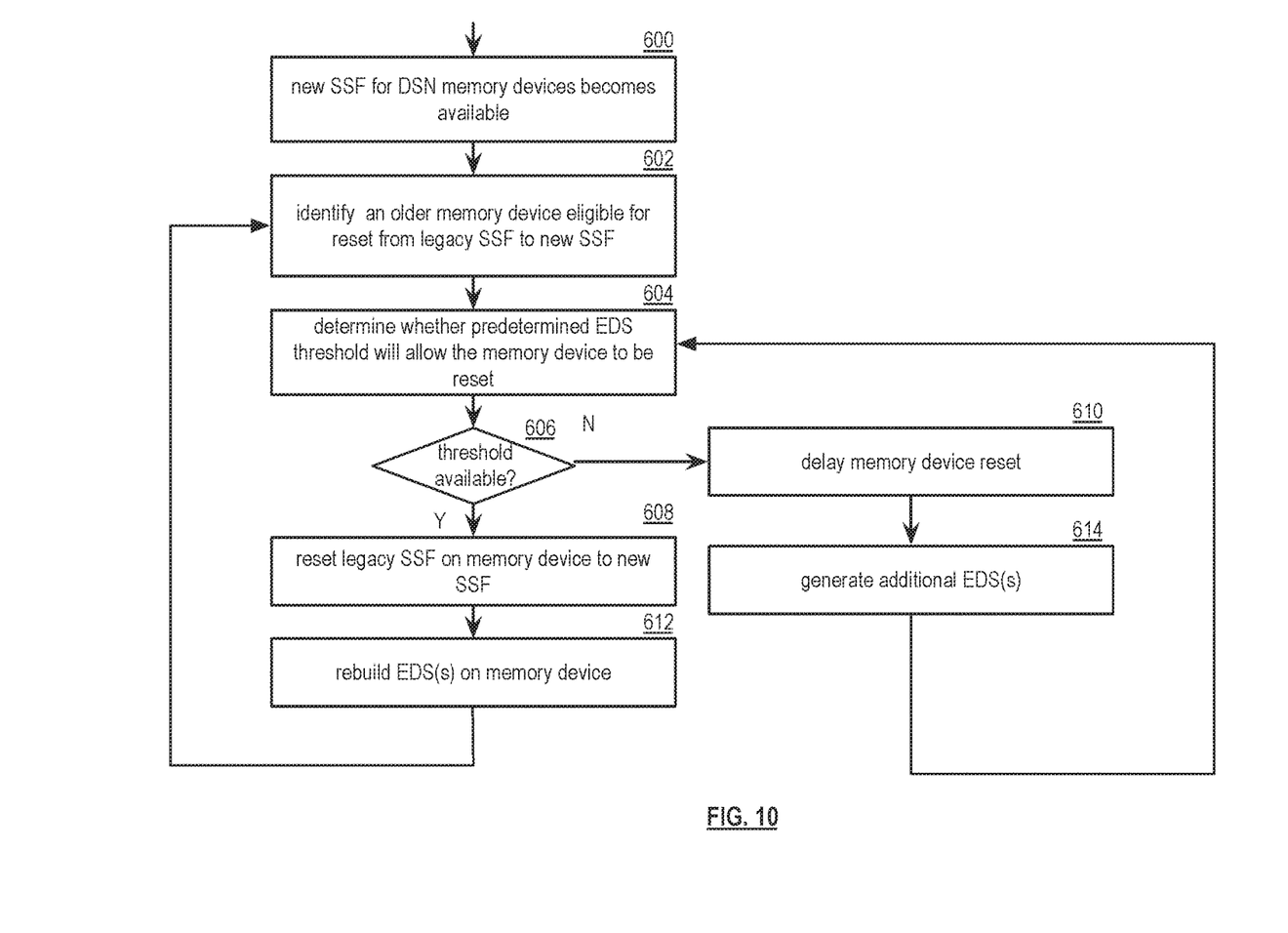
FIG. 10 is a flowchart of an example of a method for resetting the disk data format for a memory device storing previously written encoded data slices in accordance with the present invention.

One method to achieve transitioning to a new SSF is by adding a new memory device and copying the slices from the memory with the legacy SSF to one or more new memory devices formatted to the new SSF. This method requires one or more new memories to be provisioned. Memory devices can also be "reset", without the necessary addition of new SUs or memory devices, followed by reformatting to a new SSF. FIG. 10 is a logic diagram of a method for resetting the disk data format for a memory device storing previously written encoded data slices. The method begins at step 600, where a new slice storage format (SSF) becomes available for memory devices in the DSN.

The method continues at step 602, where an older memory device using an older or legacy SSF is identified by the SU or other processing unit in the DSN and determined to be eligible to be reset to the new SSF. Since the reset process eliminates all the slices on the memory device, the SU or other processing unit must first ensure that the loss of encoded data slices held on the memory device will not reduce the number of encoded data slices below a predetermined threshold level, such as a threshold shown in FIG. 9B (see step 604). Once it is determined, in step 606, that a predetermined threshold number of encoded data slices will be available once the encoded data slices on the subject memory device are lost or overwritten, the memory device is reset, in step 608, and formatted to the updated SSF.

The method then continues at step 612, where the SU waits until all the encoded data slices owned by the subject memory device are rebuilt. The SU may initiate or facilitate the rebuilding of this range by, for example scanning it for missing slices, by making a list of slices to be rebuilt prior to resetting, by performing rebuild operations or by inserting names to be rebuilt into a rebuild task queue. The method can then return to step 602 to identify additional memory devices using legacy SSFs. If a reset will reduce the number of encoded data slices below the predetermined threshold (step 606), the DS unit or other processing unit can wait (step 610) for additional encoded data slices to be added or rebuilt (step 614). Once additional encoded data slices become available the method can restart at step 604.

Figure 11:
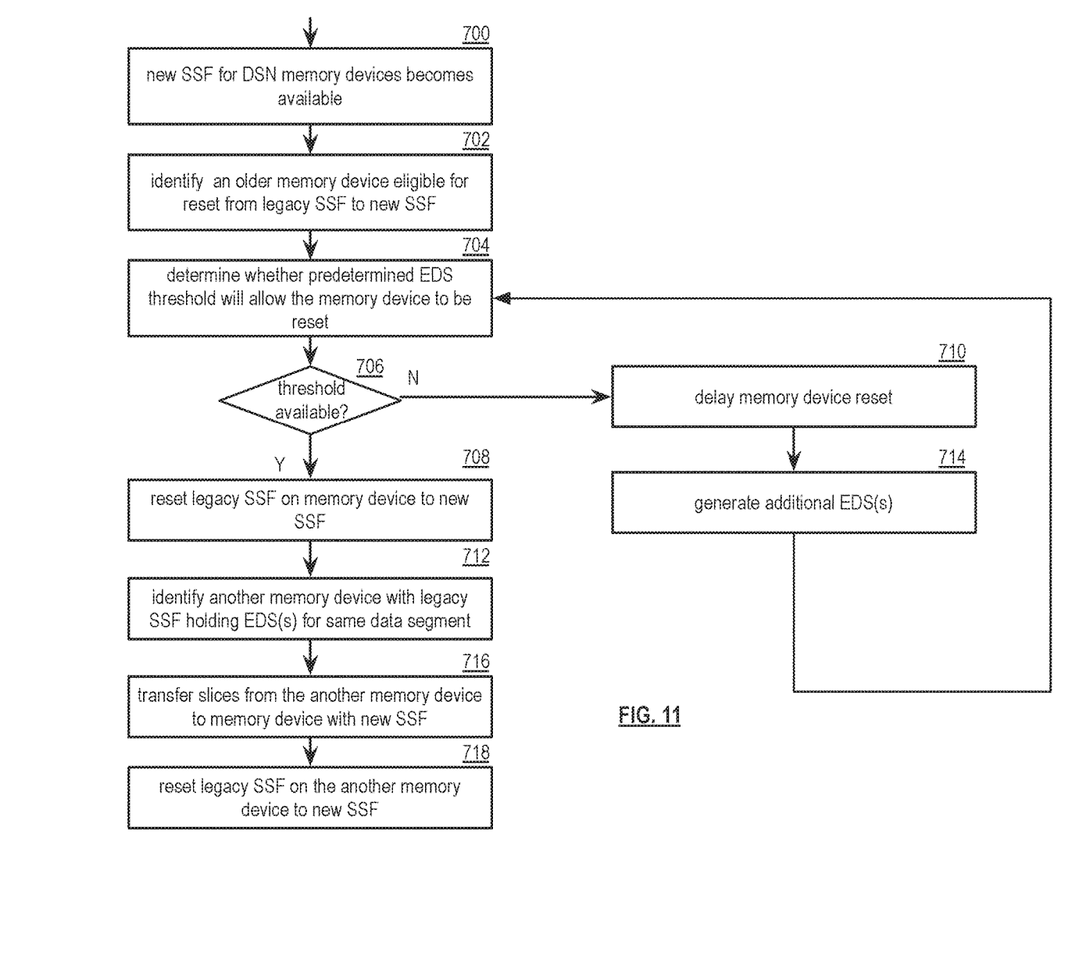
FIG. 11 is a flowchart of an example of another method for resetting the disk data format for a memory device storing previously written encoded data slices in accordance with the present invention.

FIG. 11 is a logic diagram of an additional method for resetting the disk data format for a memory device storing previously written encoded data slices. The method begins at step 700, where a new slice storage format (SSF) becomes available for memory devices in the DSN. The method continues at step 702, where an older memory device using an older or legacy SSF is identified by the SU or other processing unit in the DSN and determined to be eligible to be reset to the new SSF. Once it is determined, in step 706, that a predetermined threshold number of encoded data slices will be available once the encoded data slices on the subject memory device are lost or overwritten, the memory device is reset and formatted to the updated SSF in step 708.

The method then continues at step 712, where the SU identifies another memory device holding encoded data slices in the legacy format and transfers, in step 716, from the another memory device to the previously reset memory device. The another memory device is then reset to the new SSF in step 718, until all legacy memory devices have been reset.

If a reset will reduce the number of encoded data slices below the predetermined threshold (step 706), the DS unit or other processing unit can wait (step 710) for additional encoded data slices to be added or rebuilt (step 714). Once additional encoded data slices become available the method can continue at step 704.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
    identifying a memory device having a first slice storage format (SSF) that is a legacy SSF to a second SSF within the DSN that includes a first encoded data slice (EDS) of a set of EDSs, wherein a data object is segmented into a plurality of data segments, wherein a data segment of the plurality of data segments is dispersed error encoded in accordance with dispersed error encoding parameters to produce the set of EDSs;
    when at least a predetermined threshold number of EDSs of the set of EDSs are included within one or more storage units (SUs) within the DSN excluding the first EDS of the set of EDSs, transitioning the first SSF of the memory device to the second SSF, wherein the first EDS of the set of EDSs having the first SSF is deleted during the transitioning;
    retrieving at least a decode threshold number of EDSs of the set of EDSs from the one or more SUs within the DSN;
    performing a rebuilding process using the at least the decode threshold number of EDSs of the set of EDSs to generate a rebuilt first EDS; and
    storing the rebuilt first EDS within the memory device to replace the first EDS of the set of EDSs having the first SSF that was deleted during the transitioning.

2. The method of claim 1, wherein the first and second SSFs are on-disk data formats for error encoded data slices.

3. The method of claim 2, wherein the first SSF is in accordance with at least one version of a Linux extended file system.

4. The method of claim 2, wherein the second SSF is in accordance with a pre-allocation of a predetermined number of files on the memory device.

5. The method of claim 2, wherein the second SSF is not in accordance a version of a Linux extended file system.

6. The method of claim 1, further comprises:
delaying the transitioning the first SSF of the memory device to the second SSF until each of the encoded data slice (EDS) of the set of EDSs is determined by the one or more processing modules of the one or more computing devices of the DSN to require rebuilding.

7. The method of claim 1 further comprises:
identifying another memory device within the DSN that includes a second encoded data slice (EDS) of the set of EDSs having a first slice storage format (SSF) that is a legacy SSF to a second SSF;
when at least a predetermined threshold number of EDSs of the set of EDSs are included within the one or more storage units (SUs) within the DSN excluding the second EDS of the set of EDSs;
transitioning the first SSF of the another memory device to the second SSF, wherein the second EDS of the set of EDSs having the first SSF is deleted during the transitioning;
retrieving at least a decode threshold number of EDSs of the set of EDSs from the one or more storage units (SUs) within the DSN;
performing a rebuilding process using the at least the decode threshold number of EDSs of the set of EDSs to generate a rebuilt second EDS; and
storing the rebuilt second EDS within the another memory device to replace the second EDS of the set of EDSs having the first SSF that was deleted during the transitioning.

8. A method for execution by one or more processing modules of one or more computing devices of a dispersed storage network (DSN), the method comprises:
identifying a first memory device having a first slice storage format (SSF) that is a legacy SSF to a second SSF within the DSN that includes a first encoded data slice (EDS) of a set of EDSs, wherein a data object is segmented into a plurality of data segments, wherein a data segment of the plurality of data segments is dispersed error encoded in accordance with dispersed error encoding parameters to produce the set of EDSs;
when at least a predetermined threshold number of EDSs of the set of EDSs are included within one or more storage units (SUs) within the DSN excluding the first EDS of the set of EDSs, transitioning the first SSF of the first memory device to the second SSF, wherein the first EDS of the set of EDSs having the first SSF is deleted during the transitioning;
identifying a second memory device having a first slice storage format (SSF) that is a legacy SSF to a second SSF within the DSN that includes a second encoded data slice (EDS) of the set of EDSs having a first slice storage format (SSF) that is a legacy SSF to a second SSF;
transferring the second encoded data slice (EDS) of the set of EDSs having a first slice storage format (SSF) that is a legacy SSF to a second SSF to the first memory device; and
transitioning the first SSF of the second memory device to the second SSF.

9. The method of claim 8, wherein the first and second SSFs are on-disk data formats for error encoded data slices.

10. The method of claim 9, wherein the first SSF is in accordance with at least one version of a Linux extended file system.

11. The method of claim 9, wherein the second SSF is in accordance with a pre-allocation of a predetermined number of files on the first memory device.

12. The method of claim 9, wherein the second SSF is not in accordance a version of a Linux extended file system.

13. The method of claim 8, further comprises:
delaying the transitioning the first SSF of the first memory device to the second SSF until each of the encoded data slice (EDS) of the set of EDSs is determined by the one or more processing modules of the one or more computing devices of the DSN to require rebuilding.

14. The method of claim 8 further comprises:
identifying a third memory device having a first slice storage format (SSF) that is a legacy SSF to the second SSF within the DSN that includes a third (EDS) of the set of EDSs;
transferring the third EDS of the set of EDSs having a first slice storage format (SSF) that is a legacy SSF to a second SSF to the second memory device; and
transitioning the first SSF of the third memory device to the second SSF.

15. A dispersed storage (DS) module in a distributed storage network (DSN) comprises:
a first module, when operable within a computing device, causes the computing device to:
identify a first memory device having a first slice storage format (SSF) that is a legacy SSF to a second SSF within the DSN that includes a first encoded data slice (EDS) of a set of EDSs, wherein a data object is segmented into a plurality of data segments, wherein a data segment of the plurality of data segments is dispersed error encoded in accordance with dispersed error encoding parameters to produce the set of EDSs;
a second module, when operable within the computing device, causes the computing device to:
when at least a predetermined threshold number of EDSs of the set of EDSs are included within one or more storage units (SUs) within the DSN excluding the first EDS of the set of EDSs, transition the first SSF of the first memory device to the second SSF, wherein the first EDS of the set of EDSs having the first SSF is deleted during the transitioning;
a third module, when operable within the computing device, causes the computing device to:
identify a second memory device having a first slice storage format (SSF) that is a legacy SSF to a second SSF within the DSN that includes a second encoded data slice (EDS) of the set of EDSs having a first slice storage format (SSF) that is a legacy SSF to a second SSF;
a fourth module, when operable within the computing device, causes the computing device to:
transfer the second encoded data slice (EDS) of the set of EDSs having a first slice storage format (SSF) that is a legacy SSF to a second SSF to the first memory device; and
a fifth module, when operable within the computing device, causes the computing device to:
transition the first SSF of the second memory device to the second SSF.

16. The dispersed storage (DS) module of claim 15, wherein the first and second SSFs are on-disk data formats for dispersed error encoded data slices.

17. The dispersed storage (DS) module of claim 16, wherein the first SSF is in accordance with at least one version of a Linux extended file system.

18. The dispersed storage (DS) module of claim 16, wherein the second SSF is in accordance with a pre-allocation of a predetermined number of files on the memory device.

19. The dispersed storage (DS) module of claim 16, wherein the second SSF is not in accordance a version of a Linux extended file system.

20. The dispersed storage (DS) module of claim 15 further comprises:
   a sixth module, when operable within the computing device, causes the computing device to:
      delay the transitioning the first SSF of the memory device to the second SSF until each of the encoded data slice (EDS) of the set of EDSs is determined by the one or more processing modules of the one or more computing devices of the DSN to require rebuilding.

\* \* \* \* \*